(12) United States Patent
Wade et al.

(10) Patent No.: US 10,318,952 B1
(45) Date of Patent: Jun. 11, 2019

(54) NFC BASE STATION AND PASSIVE TRANSMITTER DEVICE

(71) Applicant: Square, Inc., San Francisco, CA (US)

(72) Inventors: Jeremy Wade, San Francisco, CA (US); Matthew H. Maibach, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 713 days.

(21) Appl. No.: 14/868,221

(22) Filed: Sep. 28, 2015

Related U.S. Application Data

(60) Provisional application No. 62/171,175, filed on Jun. 4, 2015, provisional application No. 62/165,923, filed on May 23, 2015.

(51) Int. Cl.
*G06Q 20/32* (2012.01)
*H04B 5/00* (2006.01)
*G06Q 20/20* (2012.01)

(52) U.S. Cl.
CPC ....... *G06Q 20/3278* (2013.01); *G06Q 20/204* (2013.01); *H04B 5/0075* (2013.01)

(58) Field of Classification Search
CPC combination set(s) only.
See application file for complete search history.

(56) References Cited

U.S. PATENT DOCUMENTS

| | | |
|---|---|---|
| 4,150,784 A | 4/1979 | Moorman et al. |
| 5,434,395 A | 7/1995 | Storck et al. |
| 5,798,507 A | 8/1998 | Kawagishi et al. |
| D405,070 S | 2/1999 | Kitagawa et al. |
| D411,524 S | 6/1999 | Kitagawa et al. |
| 6,098,888 A | 8/2000 | Praden |
| 6,378,073 B1 | 4/2002 | Davis et al. |

(Continued)

FOREIGN PATENT DOCUMENTS

| | | |
|---|---|---|
| AU | 2017245414 A1 | 11/2017 |
| CA | 2 968 660 A1 | 5/2016 |

(Continued)

OTHER PUBLICATIONS

Notice of Allowance dated May 12, 2017, for Design U.S. Appl. No. 29/575,535, of Nguyen, A.P., filed Jul. 25, 2016.

(Continued)

*Primary Examiner* — Zhitong Chen
(74) *Attorney, Agent, or Firm* — Polsinelli

(57) ABSTRACT

A payment device for a point-of-sale system that is configured to operate in a reader mode and in a transmitter mode. When in a first (reader) mode of operation as a seller device, the payment device is configured to receive first payment object information from a first payment object, such as a near field communication (NFC) enabled payment object. When in the second (transmitter) mode of operation as a buyer device, the payment device is configured to receive second payment information from a second payment object, such as an integrated circuit (IC) enabled payment object, and to transmit the second payment object information using a NFC protocol. The payment device includes a NFC antenna and a driving circuit configured to drive the NFC antenna to create a magnetic field when in the first mode of operation.

20 Claims, 9 Drawing Sheets

(56) References Cited

U.S. PATENT DOCUMENTS

| | | |
|---|---|---|
| 6,426,944 B1 | 7/2002 | Moore |
| 6,702,182 B1 | 3/2004 | Kanayama |
| D495,700 S | 9/2004 | Mukai et al. |
| D500,039 S | 12/2004 | Chen |
| 7,370,804 B2 | 5/2008 | Ishii |
| 7,712,670 B2 | 5/2010 | Sauerwein, Jr. et al. |
| D653,664 S | 2/2012 | Turnbull et al. |
| D675,173 S | 1/2013 | Paradise et al. |
| D676,047 S | 2/2013 | White et al. |
| D680,537 S | 4/2013 | Miller et al. |
| D681,639 S | 5/2013 | Cruz et al. |
| D688,241 S | 8/2013 | Miller et al. |
| D696,255 S | 12/2013 | Bousfield et al. |
| D705,201 S | 5/2014 | Isaacs et al. |
| D711,876 S | 8/2014 | McWilliam et al. |
| 8,818,867 B2 | 8/2014 | Baldwin et al. |
| D716,304 S | 10/2014 | Orthey |
| D719,561 S | 12/2014 | Akana et al. |
| 9,058,172 B2 | 6/2015 | Babu et al. |
| 9,063,737 B2 | 6/2015 | Babu et al. |
| 9,088,403 B1 | 7/2015 | Caggioni et al. |
| D736,207 S | 8/2015 | Bousfield et al. |
| D740,285 S | 10/2015 | Templeton |
| D740,286 S | 10/2015 | Templeton |
| D740,819 S | 10/2015 | Weber et al. |
| D740,820 S | 10/2015 | Templeton et al. |
| 9,286,494 B1 | 3/2016 | Lamfalusi et al. |
| 9,317,848 B2 | 4/2016 | Hammad |
| 9,396,368 B1 | 7/2016 | Lamba et al. |
| 9,424,445 B2 | 8/2016 | Lamfalusi et al. |
| D766,238 S | 9/2016 | Nguyen |
| D766,901 S | 9/2016 | Nguyen |
| 9,438,300 B1 | 9/2016 | Oliaei |
| D774,510 S | 12/2016 | Rotsaert |
| D776,658 S | 1/2017 | Zhu et al. |
| D780,731 S | 3/2017 | Kim et al. |
| 9,652,641 B2 | 5/2017 | Lamfalusi et al. |
| 9,721,123 B1 | 8/2017 | Wade |
| D797,740 S | 9/2017 | Nguyen |
| 9,760,743 B2 | 9/2017 | Lamfalusi et al. |
| 9,858,448 B1 | 1/2018 | Terra et al. |
| 10,002,268 B1 | 6/2018 | Terra et al. |
| 2001/0029595 A1 | 10/2001 | Murata |
| 2002/0060249 A1 | 5/2002 | Perron |
| 2003/0067940 A1 | 4/2003 | Edholm |
| 2004/0124246 A1 | 7/2004 | Allen et al. |
| 2005/0156026 A1 | 7/2005 | Ghosh et al. |
| 2005/0184164 A1 | 8/2005 | De Jong |
| 2006/0109123 A1 | 5/2006 | Carrender |
| 2006/0142058 A1 | 6/2006 | Elias et al. |
| 2006/0157565 A1 | 7/2006 | Shiomi |
| 2006/0192542 A1 | 8/2006 | Uguen |
| 2006/0219776 A1 | 10/2006 | Finn |
| 2007/0012763 A1 | 1/2007 | Van de Velde et al. |
| 2007/0090927 A1 | 4/2007 | Potyrailo et al. |
| 2007/0260638 A1 | 11/2007 | Madsen et al. |
| 2008/0189547 A1 | 8/2008 | Sugiyama |
| 2008/0238679 A1* | 10/2008 | Rofougaran ......... G06K 7/0008 340/572.2 |
| 2008/0245851 A1* | 10/2008 | Kowalski ........... G06K 7/10178 235/375 |
| 2008/0301030 A1 | 12/2008 | Boss et al. |
| 2008/0301050 A1 | 12/2008 | DiGioacchino |
| 2009/0006262 A1 | 1/2009 | Brown et al. |
| 2009/0043918 A1 | 2/2009 | Schroeder |
| 2009/0132852 A1 | 5/2009 | Sekiya |
| 2009/0283600 A1 | 11/2009 | Chang et al. |
| 2010/0224684 A1 | 9/2010 | Bonnin et al. |
| 2010/0252624 A1 | 10/2010 | Van de Velde et al. |
| 2010/0253482 A1* | 10/2010 | Catala Mora .... G06K 19/07703 340/10.4 |
| 2010/0308976 A1 | 12/2010 | Seban et al. |
| 2011/0070834 A1 | 3/2011 | Griffin et al. |
| 2011/0179494 A1 | 7/2011 | Adams et al. |
| 2011/0244799 A1 | 10/2011 | Roberts et al. |
| 2012/0017106 A1 | 1/2012 | Curren et al. |
| 2012/0126009 A1 | 5/2012 | Osen et al. |
| 2012/0126011 A1 | 5/2012 | Lamba et al. |
| 2012/0159207 A1 | 6/2012 | Chao et al. |
| 2012/0166344 A1 | 6/2012 | Cheng et al. |
| 2012/0173817 A1 | 7/2012 | Jiang et al. |
| 2012/0185397 A1 | 7/2012 | Levovitz |
| 2012/0215830 A1 | 8/2012 | Anguiano |
| 2012/0226601 A1 | 9/2012 | Cole et al. |
| 2013/0006847 A1* | 1/2013 | Hammad ............... G06Q 20/20 705/39 |
| 2013/0035051 A1 | 2/2013 | Mujtaba et al. |
| 2013/0040560 A1 | 2/2013 | Kennedy et al. |
| 2013/0095755 A1* | 4/2013 | Moreton ............ G06Q 20/3226 455/41.1 |
| 2013/0248601 A1* | 9/2013 | Liang ..................... G06K 7/083 235/440 |
| 2013/0299574 A1 | 11/2013 | Theobald |
| 2013/0314214 A1 | 11/2013 | Leica et al. |
| 2014/0052637 A1 | 2/2014 | Jooste et al. |
| 2014/0127995 A1 | 5/2014 | Hendricksen et al. |
| 2014/0187153 A1 | 7/2014 | Zhu et al. |
| 2014/0189359 A1 | 7/2014 | Marien et al. |
| 2014/0217169 A1 | 8/2014 | Lewis et al. |
| 2014/0289465 A1 | 9/2014 | Suduo |
| 2014/0328488 A1 | 11/2014 | Caballero et al. |
| 2014/0331072 A1 | 11/2014 | Osen et al. |
| 2015/0118956 A1 | 4/2015 | Desai et al. |
| 2015/0242663 A1 | 8/2015 | Babu et al. |
| 2015/0249485 A1 | 9/2015 | Ouyang et al. |
| 2015/0341073 A1 | 11/2015 | Ayala Vazquez et al. |
| 2015/0355251 A1 | 12/2015 | Pascolini |
| 2016/0026831 A1 | 1/2016 | Babu et al. |
| 2016/0126619 A1 | 5/2016 | Tenbroek et al. |
| 2016/0306977 A1 | 10/2016 | Zarakas et al. |
| 2016/0307189 A1 | 10/2016 | Zarakas et al. |
| 2016/0342819 A1 | 11/2016 | Lamba et al. |
| 2016/0345123 A1 | 11/2016 | Lamba et al. |
| 2017/0028693 A1 | 2/2017 | Free et al. |
| 2017/0046677 A1 | 2/2017 | Babu et al. |
| 2017/0242961 A1 | 8/2017 | Shukla et al. |
| 2018/0189771 A1 | 7/2018 | Terra |
| 2018/0189772 A1 | 7/2018 | Terra |
| 2018/0218181 A1 | 8/2018 | Terra et al. |
| 2018/0240103 A1 | 8/2018 | Rezayee et al. |
| 2018/0240117 A1 | 8/2018 | Rezayee et al. |

FOREIGN PATENT DOCUMENTS

| | | |
|---|---|---|
| EP | 1 431 861 A2 | 6/2004 |
| WO | 01/01300 A1 | 1/2001 |
| WO | 2009/149715 A1 | 12/2009 |
| WO | 2012/003892 A1 | 1/2012 |
| WO | 2013/051032 A1 | 4/2013 |
| WO | 2014/008310 A1 | 1/2014 |
| WO | 2015/001468 A1 | 1/2015 |
| WO | 2016/081804 A1 | 5/2016 |
| WO | 2016/191299 A2 | 12/2016 |
| WO | 2018/125808 A1 | 7/2018 |
| WO | 2018/144591 A1 | 8/2018 |
| WO | 2018/156742 A1 | 8/2018 |

OTHER PUBLICATIONS

Non-Final Office Action dated May 19, 2017, for U.S. Appl. No. 15/336,597, of Babu, A., et al., filed Oct. 27, 2016.

Advisory Action dated May 26, 2017, for U.S. Appl. No. 141868,247, of Lamba, K., et al., filed Sep. 28, 2015.

Notice of Allowance dated May 31, 2017, for U.S. Appl. No. 15/094,598, of Lamba, K., et al., filed Apr. 38, 2016.

Notice of Allowance dated Mar. 9, 2016, for U.S. Appl. No. 14/874,301, of Babu, A., et al., filed Oct. 2, 2015.

Notice of Allowance dated Mar. 18, 2016, for U.S. Appl. No. 14/868,261, of Lamba, K., et al., filed Sep. 28, 2015.

First Examination Report for Indian Design Application No. 277744, dated Mar. 8, 2016.

(56) References Cited

OTHER PUBLICATIONS

First Examination Report for Indian Design Application No. 277745, dated Mar. 11, 2016.
Certificate of Registration for European Design Registration No. 002873877-0001, dated Nov. 23, 2015.
Certificate of Registration for European Design Registration No. 002873877-0002, dated Nov. 23, 2015.
Non-Final Office Action dated Nov. 25, 2015, for U.S. Appl. No. 14/868,261, of Lamba, K., et al., filed Sep. 28, 2015.
Examination Report dated Dec. 1, 2015, for Community Design Registration Nos. 002873877-0001/002873877-0002, filed on Nov. 23, 2015.
Non-Final Office Action dated Jan. 21, 2016, for U.S. Appl. No. 14/709,375, of Babu, A., et al., filed May 11, 2015.
Non-Final Office Action dated May 8, 2014, for U.S. Appl. No. 13/603,941, of Babu, A., et al., filed Sep. 5, 2012.
Non-Final Office Action dated May 12, 2014, for U.S. Appl. No. 13/603,992, of Babu, A., et al., filed Sep. 5, 2012.
Notice of Allowance dated Feb. 9, 2015, for U.S. Appl. No. 13/603,992, of Babu, A., et al., filed Sep. 5, 2012.
Notice of Allowance dated Feb. 17, 2015, for U.S. Appl. No. 13/603,941, of Babu, A., et al., filed Sep. 5, 2012.
Non-Final Office Action dated Jul. 9, 2015, for U.S. Appl. No. 14/709,375, of Babu, A., et al., filed May 11, 2015.
International Search Report and Written Opinion for International Application No. PCT/US2013/049162, dated Oct. 16, 2013.
Notice of Allowance dated Sep. 8, 2017, for U.S. Appl. No. 15/336,597, of Babu, A., et al., filed Oct. 27, 2016.
Certificate of Registration for Canadian Design Registration No. 165620, mailed on Jun. 23, 2016.
Certificate of Registration for Canadian Design Registration No. 165621, mailed on Jun. 23, 2016.
Notice of Allowance dated Jun. 29, 2016, for Design U.S. Appl. No. 29/528,683, of Nguyen, A., filed May 29, 2015.
English-language translation of Decision of Registration (Allowance) for Japanese Design Patent Application No. 2015-026521, dated Jul. 5, 2016.
English-language translation of Decision of Registration (Allowance) for Japanese Design Patent Application No. 2015-026523, dated Jul. 5, 2016.
Notice of Allowance dated Jul. 13, 2016, for Design U.S. Appl. No. 29/532,633, of Nguyen, A., filed Jul. 8, 2015.
Notice of Allowance dated Jul. 28, 2016, for U.S. Appl. No. 14/709,375, of Babu, A., et al., filed May 11, 2015.
Certificate of Design Registration for Japanese Design Patent Application No. 2015-026523, mailed Aug. 12, 2016 (Registration No. 1558509).
Certificate of Design Registration for Australian Design Registration No. 365814, dated Dec. 15, 2015.
Certificate of Design Registration for Australian Design Registration No. 365812, dated Dec. 15, 2015.
Certificate of Design Registration for Japanese Design Patent Application No. 2015-026521, dated Aug. 12, 2016 (Registration No. 1558508).
Office Action for European Patent Application No. 13 740 420.8, dated Feb. 7, 2017.
Final Office Action dated Mar. 21, 2017, for U.S. Appl. No. 14/868,247, of Lamba, K., et al., filed Sep. 28, 2015.
Gebhart, M., et al., "Automated Antenna Impedance Adjustment for Near Field Communication (NFC)," 12th International Conference on Telecommunications (ConTEL), pp. 235-242 (Jun. 26-28, 2013).
Non-Final Office Action dated Jan. 25, 2017, for U.S. Appl. No. 15/094,598, of Lamba, K., et al., filed Apr. 8, 2016.
International Search Report and Written Opinion for International Patent Application No. PCT/US2016/033601, dated Nov. 22, 2016.
English-language translation of Office Action for Japanese Design Application No. 2015-026521, dated Mar. 15, 2016.
English-language translation of Office Action for Japanese Design Application No. 2015-026523, dated Mar. 15, 2016.
Notice of Allowance dated May 17, 2016, for Design U.S. Appl. No. 29/528,683, of Nguyen, A., filed May 29, 2015.
Notice of Allowance dated May 17, 2016, for Design U.S. Appl. No. 29/532,633, of Nguyen, A.P., filed Jul. 8, 2015.
Notice of Allowance dated Nov. 20, 2017, for U.S. Appl. No. 14/868,247, of Lamba, K., et al., filed Sep. 28, 2015.
Certificate of Design Registration for Indian Design Patent Application No. 277744, dated Aug. 23, 2016.
Certificate of Design Registration for Indian Design Patent Application No. 277745, dated Sep. 26, 2016.
Non-Final Office Action dated Oct. 25, 2016, for U.S. Appl. No. 14/868,247, of Lamba, K., et al., filed Sep. 28, 2015.
Non-Final Office Action dated Sep. 16, 2015, for U.S. Appl. No. 14/549,338, of Lamfalusi, M.C., et al., filed Nov. 20, 2014.
Notice of Allowance dated Nov. 10, 2015, for U.S. Appl. No. 14/549,338, of Lamfalusi, M.C., et al., filed Nov. 20, 2014.
Non-Final Office Action dated Jan. 14, 2016, for U.S. Appl. No. 14/947,162, of Lamfalusi, M.C., et al., filed Nov. 20, 2015.
Notice of Allowance dated Mar. 25, 2016, for U.S. Appl. No. 14/947,162, of Lamfalusi, M.C., et al., filed Nov. 20, 2015.
Non-Final Office Action dated Aug. 25, 2016, for U.S. Appl. No. 15/220,262, of Lamfalusi, M.C., et al., filed Jul. 26, 2016.
Non-Final Office Action dated Aug. 25, 2016, for U.S. Appl. No. 15/221,383, of Lamfalusi, M.C., et al., filed Jul. 27, 2016.
Notice of Allowance dated Jan. 5, 2017, for U.S. Appl. No. 15/220,262, of Lamfalusi, M.G., et al., filed Jul. 26, 2016.
Ex Parte Quayle Action dated Jan. 26, 2017, for U.S. Appl. No. 14/967,108, of Wade, J., filed Dec. 11, 2015.
Notice of Allowance dated Mar. 22, 2017, for U.S. Appl. No. 14/967,108, of Wade, J., filed Dec. 11, 2015.
Non-Final Office Action dated Apr. 12, 2017, for U.S. Appl. No. 15/396,609, of Terra, D., filed Dec. 31, 2016.
Notice of Allowance dated Apr. 21, 2017, for U.S. Appl. No. 15/221,383, of Lamfalusi, M.C., et al., filed Jul. 27, 2016.
Notice of Allowance dated Aug. 23, 2017, for U.S. Appl. No. 15/420,730, of Terra, D., et al., filed Jan. 31, 2017.
Final Office Action dated Nov. 15, 2017, for U.S. Appl. No. 15/396,609, of Terra, D., filed Dec. 31, 2016.
Examination Report No. 1 for Australian Patent Application No. 2017245444, dated Dec. 1, 2017.
Notice of Allowance dated Feb. 5, 2018, for U.S. Appl. No. 15/421,373, of Terra, D., et al., filed Jan. 31, 2017.
Examiner Requisition for Canadian Patent Application No. 2,968,660, dated Mar. 2, 2018.
Non-Final Office Action dated Jul. 19, 2018, for U.S. Appl. No. 15/824,945, of Terra, D., et al., filed Nov. 28, 2017.
Non-Final Office Action dated Aug. 13, 2018, for U.S. Appl. No. 15/396,609, of Terra, D., filed Dec. 31, 2016.
Notice of Acceptance for Australian Patent Application No. 2017245444, dated Aug. 29, 2018.
Non-Final Office Action dated Aug. 31, 2018, for U.S. Appl. No. 15/650,713, of Wade, J., filed Jul. 14, 2017.
International Search Report and Written Opinion for International Application No. PCT/US2015/061771 dated Jan. 29, 2016.
International Search Report and Written Opinion for International Application No. PCT/US2017/068220, dated Apr. 10, 2018.
International Search Report and Written Opinion for International Application No. PCT/US2018/016219, dated Apr. 30, 2018.
International Search Report and Written Opinion for International Application No. PCT/US2018/019191, dated May 30, 2018.

\* cited by examiner ns of a merchant device.

NFC BASE STATION AND PASSIVE TRANSMITTER DEVICE

CROSS-REFERENCE TO RELATED APPLICATIONS

This application is a non-provisional conversion of, and claims priority to, U.S. Provisional Application No. 62/165,923, filed May 23, 2015, entitled "NFC BASE STATION AND PASSIVE TRANSMITTER DEVICE," and this application is a non-provisional of, and claims priority to, U.S. Provisional Application No. 62/171,175, filed Jun. 4, 2015, entitled "TUNING NFC ANTENNA BASED ON POWER LEVEL OF A POWER SYSTEM OF THE NFC ANTENNA," both of which are hereby incorporated by reference herein in their entireties.

BACKGROUND

Consumers can interact with merchants to conduct various financial payment transactions. For example, a consumer can conduct a transaction with a merchant at a point-of-sale system using cash, a transaction card, or other transaction instrument. Conventional systems can include expensive and bulky financial transaction electronics, as may include a card reader for payment cards (e.g., debit or credit cards), a cash drawer, monitors, keyboards, and various other electronic devices. Some point-of-sale systems require multiple types of card readers and/or complex and bulky card-reading equipment in order to accept multiple types of payment cards. Some systems include a card reader that is inserted into a port, such as the audio jack, of a mobile device to read data off a payment card and provide the information to the mobile device.

BRIEF DESCRIPTION OF THE DRAWINGS

In order to describe features of the disclosure, a more particular description of the presently described technology will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
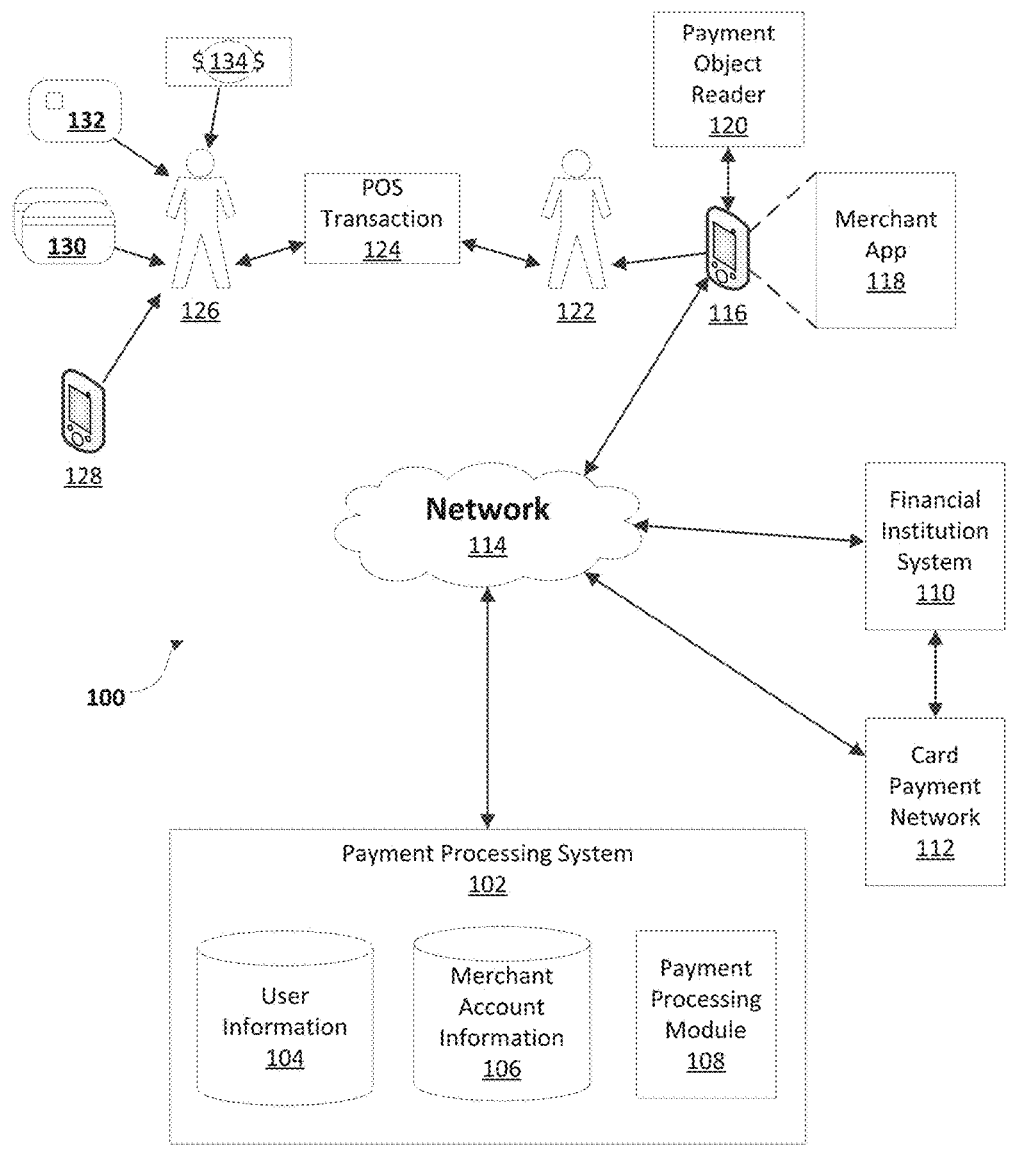
FIG. 1 illustrates an example architecture of a payment communication system for enabling transactions between merchants and buyers.

System, devices, methods, and non-transitory computer-readable media are disclosed in accordance with various embodiments of the present disclosure overcome one or more of the above-referenced and other deficiencies in conventional approaches to point of sale systems. In particular, in accordance with various embodiments, approaches provide for a payment object reader that is used in performing a payment transaction at a point-of-sale system.

In a point-of-sale transaction, a seller is able to use a merchant application on a merchant device that is in wireless communication, for example via Bluetooth or BLE, to a payment reader that is NFC and EMV enabled to accept both NFC and EMV payments from customers. The seller is also then able to use the payment reader to make payments, and act as a buyer in another point-of-sale transaction, by modulating a signal using the NFC protocol that transmits data, using the NFC protocol, from a payment object. The payment object can be any one of an EMV card inserted into the payment reader, a previously-read EMV card or NFC object, or another type of payment account, for example payment account information entered into the mobile device through a UI or received from the Internet.

A payment object reader/transmitter device used in performing a point-of-sale transaction can operate in both a reader mode and a transmitter mode. When in a first (reader) mode of operation as seller device, the payment device is configured to receive first payment object information from a first payment object, such as a near field communication (NFC) enabled payment object. When in the second (transmitter) mode of operation as a buyer device, the payment device is configured to receive second payment information from a second payment object, such as an integrated circuit (IC) enabled payment object, and to transmit the second payment object information using a NFC protocol.

The payment device includes a NFC antenna and a driving circuit configured to drive the NFC antenna to create a magnetic field when in the first mode of operation. In the first mode of operation, the magnetic field can be load modulated by a NFC enabled payment object. A microcontroller of the payment device is configured in the first mode to receive the first payment information received by the NFC antenna and transmit the first payment object information to a merchant device. The merchant device can have a merchant application running thereon used in conducting a point-of-sale transaction.

The payment device also includes an IC payment object reader and a load modulation subsystem connected to the NFC antenna. The microcontroller is configured to, in the second mode, turn off the driving circuit of the antenna and receive second payment information from the IC payment object reader. The microcontroller transmits the second payment object information via the NFC antenna using NFC protocol. The microcontroller instructs the load modulation subsystem to control the NFC antenna to modulate the second magnetic field to transmit the second payment object information.

Other advantages, variations, and functions are described and suggested below as can be provided in accordance with the various embodiments.

As used herein, a financial transaction is a transaction that is conducted between a customer and a merchant at a point-of-sale. When paying for a financial transaction, the customer can provide the merchant with cash, a check, or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

FIG. 1 illustrates an example architecture of a payment communication system 100 for enabling point-of-sale (POS) transactions between merchants 122 and buyers 126. In the example of FIG. 1, a buyer 126 can use any of a variety of payment objects, such as payment cards 130, 132 or cash 134 when participating in a POS transaction 124 with a merchant 122. A buyer 126 can typically have payment cards 130, 132 such as credit cards, debit cards, prepaid cards, and the like, that the buyer 126 can use for conducting a POS transaction 124. In some embodiments, the payment cards 130 can include one or more magnetic stripes for providing payment object and buyer information when swiped in a payment object reader 120 communicatively coupled to a merchant device 116. In some embodiments, other types of payment objects can be used, for example smart cards 132 having a built in integrated circuit including a memory chip (e.g., EMV payment objects), a radio frequency identification tag (e.g., near field communication enabled objects), and the like. In some embodiments, the user 126 can use the user device 128 to conduct NFC payment transactions through communication between the user device 128 and the payment object reader/transmitter device 120.

The payment communication system 100 in the example of FIG. 1 illustrates a merchant device 116 associated with the merchant 122 that participates in the payment service provided by the payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 106 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system.

Each merchant device 116 can include an instance of a merchant application 118 executed on the merchant device. The merchant application 118 can provide POS functionality to enable the merchant 122 to accept payments at a POS location using the merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that the merchant 122 operates a food truck, is a street vendor, a cab driver, or has an otherwise mobile business, e.g., in the case of merchants who sell items at buyers' homes, buyers' places of business, etc.

The merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. Short-range communication as used herein refers to communication protocols having a generally short range of communication (less than 100 meters in some embodiments), such as NFC communication, RFID (radio frequency identification) tags, or Wi-Fi, etc. The payment object reader can read data from a magnetic stripe card or an EMV chip-type card and communicate the data to the merchant device 116. The payment object reader can also read data from a NFC device and communicate the data to the merchant device 116.

Accordingly, the merchant 122 and the buyer 126 can conduct a POS transaction 124 by which the buyer 126 acquires an item or service from the merchant 122 at a POS location. The merchant application 118 on the merchant device 116 can send transaction information to the payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some embodiments, the payment processing system is configured to send and receive data to and from the user device and the merchant device. For example, the payment system can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, the payment system can also be configured to communicate with a computer system of a card payment network 112, e.g., MasterCard®, VISA®, etc., over the network, or over a different network, for example, to conduct electronic financial transactions. The computer system of the card payment network can communicate with a computer system of a financial institution system 110, e.g., a bank. There can be computer systems of other entities, e.g., the card acquirer, between the payment system and the computer system of the card issuer.

The payment system can then communicate with the computer system of a card payment network 112 to complete an electronic financial transaction for the total amount to be billed to the customer's financial account. Once the electronic financial transaction is complete, the payment system can communicate data describing the card-less payment transaction to the user device, e.g., an electronic receipt, which can, for example, notify the customer of the total amount billed to the user for the card-less payment transaction with the particular merchant.

The transaction information can include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer can sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), data describing a buyer, any type of data that is received upon a buyer's authentication into a social network, if any, and various other types of information.

To accept electronic payments using the POS system 100, the merchant 122 typically creates a merchant account with the payment processing system 102 by providing information describing the merchant including, for example, merchant name, contact information (e.g., telephone numbers, the merchant's address, and one or more financial accounts to which funds collected from buyers will be deposited). This merchant information can be securely stored by the payment processing system, for example, as merchant account information 106 in a secure database. Further, the merchant information can include a merchant profile created for each merchant. The merchant profile can include information about the merchant 122 and transaction information associated with transactions conducted by the merchant.

The payment processing system 102 provides a payment service in which merchants 122 are able to conduct POS transactions 124 with a plurality of buyers 126, such as for selling services and/or products to the buyers 126. The payment processing system 102 can include one or more servers that are configured to process secure electronic financial transactions, e.g., payment during a POS transaction 124, by communicating with the merchant device 116, card payment networks 112, and bank or other financial institution payment systems 110. The payment processing system 102 includes a payment processing module 108 that receives transaction information for processing payments made through the merchant application 118. For example, the payment processing module 108 can receive transaction information, such as an amount of the transaction, and can verify that a particular payment card 130, 132 can be used to pay for the transaction, such as by contacting a card clearinghouse of a card payment network 112. Furthermore, in some examples, the payment processing module 108 can redirect payment information for transactions to be made using payment cards 130, 132 to a bank, or other financial institution, payment system 110. In other embodiments, the merchant device 116 can communicate directly with an appropriate card payment network 112 or bank payment system 110 for approving or denying a transaction using a particular payment card 130, 132 for a POS transaction 124.

As introduced above, the payment processing system 102 can be configured to communicate with one or more systems of a card payment network 112 (e.g., MasterCard®, VISA®, etc) over the network 114 to conduct financial transactions electronically. The payment processing system 102 can also communicate with one or more bank payment systems 110 of one or more banks over the network 114. For example, the payment processing system 102 can communicate with an acquiring bank, a payment card issuing bank, and/or a bank maintaining buyer accounts for electronic payments.

A payment card acquiring bank can be a registered member of a card association (e.g., Visa®, MasterCard®, etc), and can be part of a card payment network 112. A payment card issuing bank can issue payment cards 130, 132 to buyers 126, and can pay acquiring banks for purchases made by cardholders to which the issuing bank has issued a payment card 130, 132. Accordingly, in some embodiments, the systems of an acquiring bank can be included in the card payment network 112 and can communicate with systems of a payment card issuing bank to obtain payment. Further, in some embodiments, bank payment systems 110 can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures and thus, the foregoing are merely several examples.

The network 114 can be a conventional type, wired or wireless, and can have numerous different configurations including a star configuration, token ring configuration, or other configurations. Furthermore, the network 114 can include an intranet, a local area network (LAN), a wide area network (WAN) (e.g., the Internet), and/or other interconnected data paths across which multiple devices can communicate. In some embodiments, the network 114 can be a peer-to-peer network. The network 114 can also be coupled with or include portions of a telecommunications network for sending data using a variety of different communication protocols. In some embodiments, the network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more than one network 114 can connect these entities. The payment system, the merchant device, and the user device can communicate over the network using wired or wireless connections, or combinations thereof.

In some embodiments, the payment system is configured to accept card-less payment transactions from customers, i.e., the customer 126. As used herein, a card-less payment transaction is a transaction conducted between the customer and a merchant at the point-of-sale during which a financial account of the customer is charged without the customer having to physically present a financial payment card to the merchant at the point-of-sale. In some forms of card-less payment transaction, the merchant receives at the point-of-sale details of the financial account via the mobile device 128 presenting payment information to the merchant 122 by communicating with the payment object reader 120, e.g. NFC transactions. In other forms of card-less payment transactions, the merchant need not receive any details about the financial account at the point-of-sale, e.g., the credit card issuer or credit card number, for the transaction to be processed. Instead, such details can be stored at the payment processing system 102 and provided to the merchant 122. Such card-less payment transactions can be referred to generally as card-on-file transactions. Generally, when a customer and a merchant enter into an electronic financial transaction, the transaction is processed by transferring funds from a financial account associated with the user account to a financial account associated with the merchant account.

Before conducting card-less payment transactions of the type that does not require that the merchant POS receive financial account details from customer 126, e.g., card-on-file transactions, the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

As used herein, the term "payment card," "payment object," or "payment instrument" refers to a payment mechanism which includes a debit card, a conventional credit card, "smartcards" that have embedded circuits, such as integrated circuit (IC) cards (e.g., Europay-MasterCard-Visa (EMV) cards), and NFC enabled payment cards, or any wallet-size card which functions as a combination of any of these payment mechanisms. In some embodiments, a payment card, payment object, or payment instrument can also include a virtual payment card stored on a device such as a smart phone or other device and transmittable, for example, via near field communication (NFC) or other suitable means.

Figure 2:
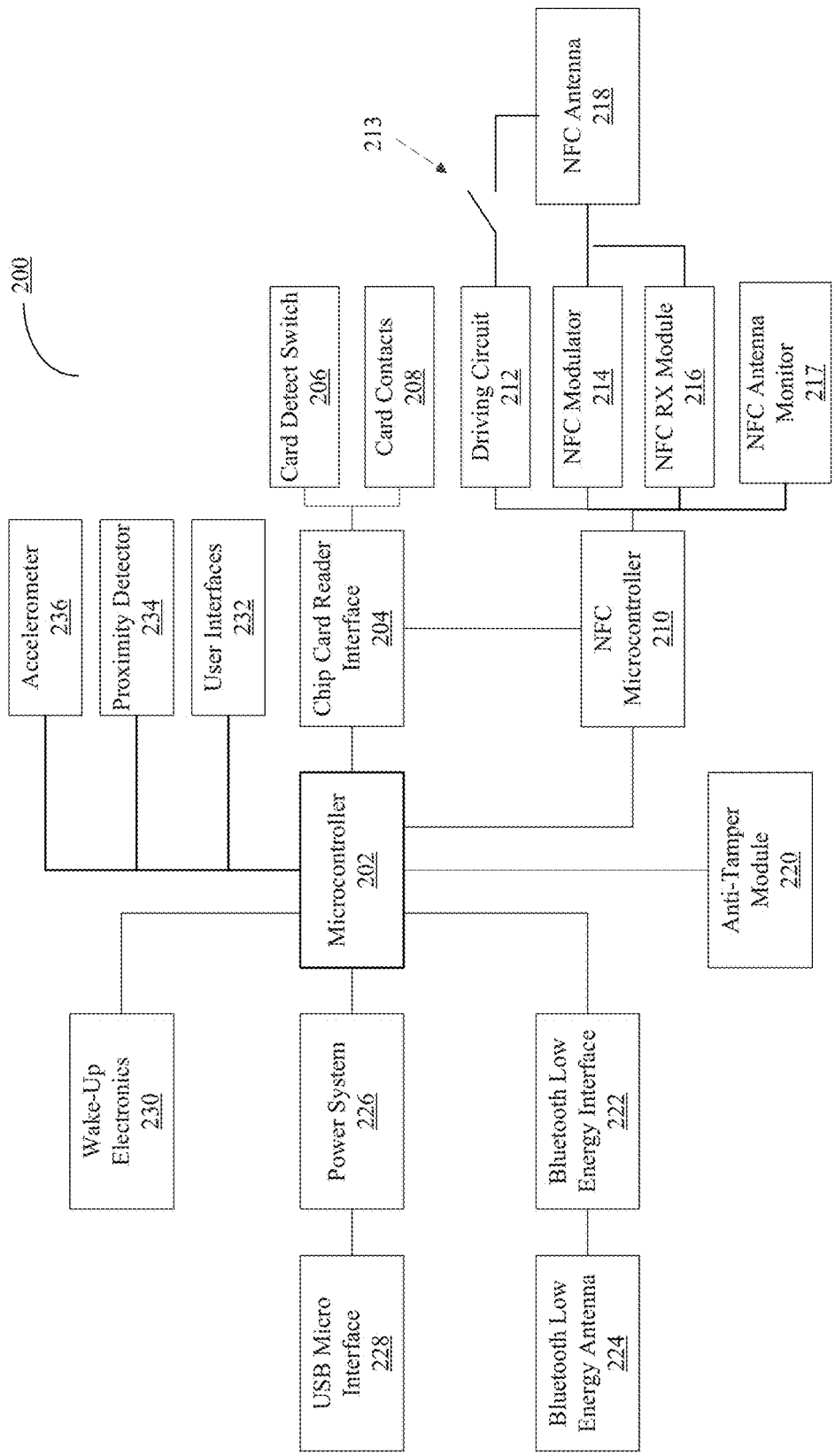
FIG. 2 illustrates an example schematic block diagram of the components of the payment object reader/transmitter device.

FIG. 2 illustrates a payment object reader/transmitter device 200 in accordance with at least some embodiments of the present invention. Payment device 200 includes microcontroller 202 configured to manage functions between various components within the device. Coupled to microcontroller 202 is chip card reader interface 204, which in turn is connected to card detect switch 206 and card contacts 208. Card contacts 208 are configured to provide electrical connectivity between the contact pads of an integrated circuit enabled payment object and chip card interface 204. Furthermore, card detect switch 206 is configured to indicate when an integrated circuit payment object is inserted into payment device 200. Card detect switch 206 may be any suitable switch, electrical, mechanical, or otherwise, and in some embodiments may be integrated with card contacts 208. In situations where card detect switch 206 indicates that an integrated circuit payment object has been inserted into payment device 200, chip card reader interface 204 may be configured to read data from the integrated circuit payment object via card contacts 208. The microcontroller 202 of the payment device is configured to receive the data read from the IC card via the card contacts 208 and then transmit the data read from the chip-type card using the NFC antenna 218 under the control of the NFC microcontroller 210.

Payment device 200 may also include a near field communication (NFC) microcontroller 210. NFC microcontroller 210 is configured to manage the transmission and reception of near field communications through control of driving circuit 212, NFC modulator 214, NFC RX module 216, NFC antenna monitoring circuit 217, and NFC antenna 218. In some embodiments, driving circuit 212 may include an H-bridge, an amplifier, a filter and/or a matching circuit. A switch 213 can be coupled on a first pole of the switch to the antenna 218 and on the second pole to the driving circuit, such that when the device is in the first receiver mode, the switch 213 is closed and the antenna is driven by the driving circuit. When the switch 213 is open, the antenna 218 is not driven by the driving circuit 212 and operates in a transmission mode. In some embodiments, switch 213 can be replaced with a switch within the driving circuit 212, such as a JFET or MOSFET switch under the control of the microcontroller 202 or NFC microcontroller 210. Furthermore, in some embodiments the NFC RX module 216 may include an op-amp, a filtering and conditioning circuit and/or a rectifier, such as a full wave bridge rectifier. Additionally, NFC modulator 214 may be, for example, a type-B modulator. In instances where it is desired to read a NFC enabled payment object, or a NFC enabled payment object is determined to be in proximity to payment device 200, NFC microcontroller 210 may be configured to drive NFC antenna 218 via driving circuit 212 to induce a magnetic field capable of being modulated by the NFC enabled payment object. From here, the modulated magnetic field signal may be converted into a digital signal that NFC microcontroller 210 can interpret via NFC RX module 216. On the other hand, when it is desired to transmit data via NFC antenna 218, NFC microcontroller 210 may be configured to disable driving circuit 212 and transmit data using the NFC protocol by instructing NFC modulator 214 to modulate the magnetic field to which NFC antenna 218 is operatively coupled. In some embodiments, there can be a switch within the NFC modulator 214 to turn on or off the load applied to the antenna. The switch can be under the control of the microcontroller 202. In some embodiments the NFC antenna 218 can drift from a desired frequency (become detuned). This can be the result of a metal object being in the proximity of device 200. The NFC antenna monitor can monitor the frequency of the antenna, and determine when the frequency of the antenna has drifted away from the desired frequency. When it is determined that the NFC antenna is out of tune, NFC antenna monitor circuit 217 can work in concert with the NFC microcontroller to vary one or parameters such as capacitance, voltage, or impedance of the NFC antenna 218 to tune the NFC antenna 218.

The microcontroller 202 receives payment data read by the chip card reader interface 204 via the card contacts 208, or alternatively from a magnetic stripe reader reading payment data from a magnetic stripe card. The payment data received at the microcontroller is stored, either temporarily or permanently, in memory of the payment device 200. The payment data stored in memory can then be transmitted via the NFC antenna 218. In some embodiments, the microcontroller 202 can receive and permanently store payment information so that the payment device 200 acts as a payment object that does not require a payment card or other payment object to be present. The payment device 200 is capable of communicating using Bluetooth, and is thus able to pair with a mobile device to obtain payment object information from a phone that has Bluetooth capabilities but does not have NFC payment capabilities.

To supply power to the components within payment device 200, power system 226 is provided. In some embodiments, power system 226 may include a battery. Coupled to power system 226 is USB micro interface 228 configured to receive a USB micro jack, although other types of connectors may be utilized. In certain embodiments, connection of a jack to USB micro interface 228 can activate a switch within power system 226 to override power supplied by the battery. This allows for battery power to be conserved for situations where external power cannot be provided. Furthermore, power system 226 may also include a battery charger to allow the battery to be charged when external power is supplied via USB micro interface 228. Payment device 200 also includes wake-up electronics 230 configured to wake-up the device from a low-power state to an active state in response to detection of a payment object. In some embodiments, wake-up electronics 230 can also power down payment device 230 to a low-power state after a predetermined amount of time or after completion of a communication.

The payment device 200 illustrated in FIG. 2 further contains a Bluetooth low energy (BLE) interface 222 and a BLE antenna 224 to enable Bluetooth communications. In addition, payment device 200 includes anti-tamper module 220 configured to prevent unauthorized tampering with the device and possible theft or interception of payment information. In certain embodiments, anti-tamper module may include a wire mesh enclosed within payment device 200.

Payment device 200 also includes user interfaces 232 to enhance the user experience. User interfaces 232 can include, but are not limited to, LED indicators, buttons and speakers. In some embodiments, speakers and LED indicators can be used to present audio and visual identifiers of transaction and device status. In addition, buttons may be configured to power payment device 200 on or off, operate the device or reset the device.

Figure 3:
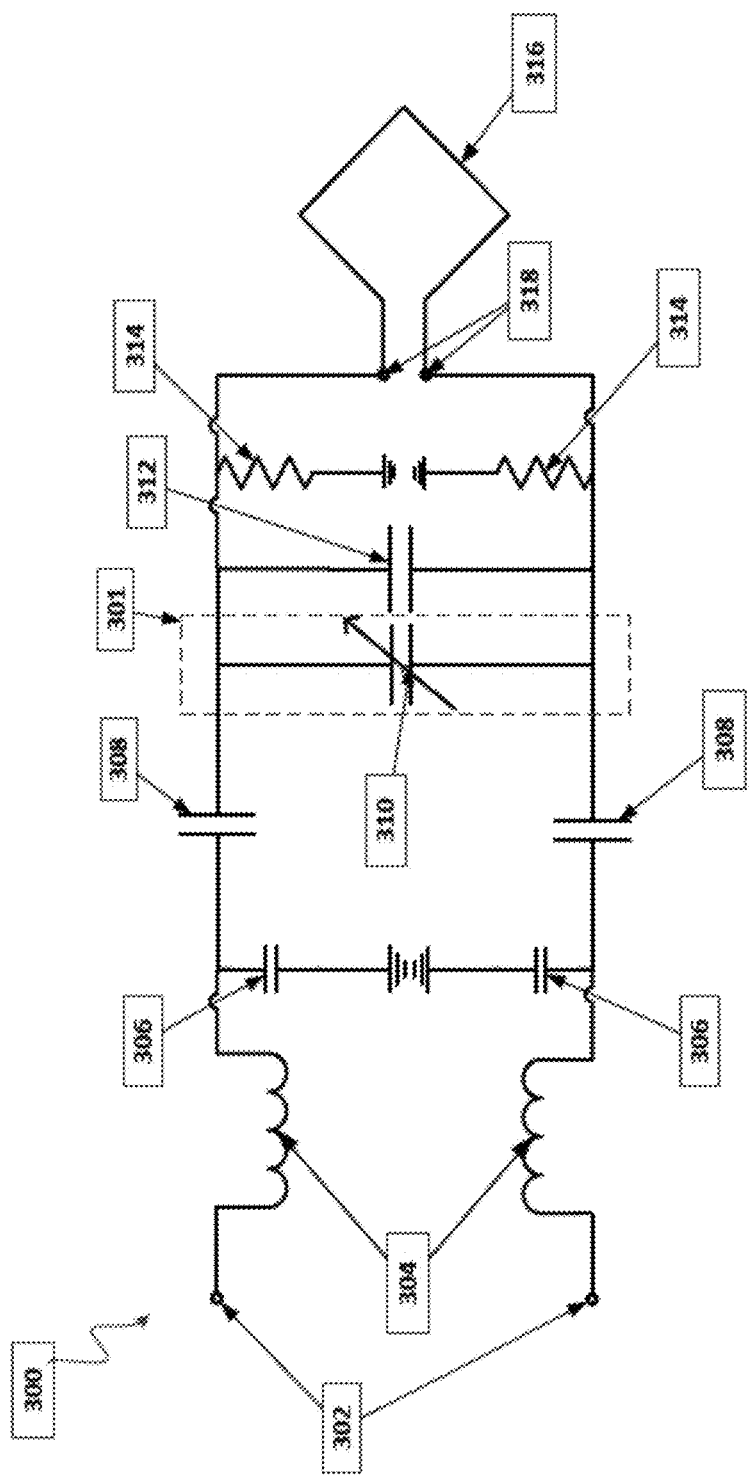
FIG. 3 is an example driving circuit for driving an antenna of the payment object reader/transmitter device.

In some embodiments, the NFC antenna 214 can be connected to a tuning circuit. The tuning circuit is shown in FIG. 3, which illustrates a NFC antenna, tuning circuit, and driving circuit. As seen in FIG. 3, circuit 300 includes inductors 304 and capacitors 308, variable capacitor 310 and bulk capacitor 312 to maintain the default resonant frequency of antenna 316.

Tuning circuit 301 includes variable capacitor 310. Capacitors 306 filter the signal and resistors 314 are bias resistors. Nodes 302 can operatively coupled to NFC microcontroller 210 or a system microcontroller 202 to control the resonant frequency of antenna 316. In some embodiments, tuning circuit 301 can tune antenna 316 by changing the capacitance of variable capacitor 310 and compensate for the detuned antenna 316. In some embodiments, the variable capacitor 310 can be a separate circuit configured to add or remove capacitance to the overall tuning circuit. For instance, an example circuit configured to add or remove capacitance to the overall tuning circuit can be a system of FET switches and a bank of discrete capacitors. Therefore, when the monitor circuit 217 determines that the NFC antenna is detuned, it can trigger controller 210 to cause the system of FET switches to switch in (or out) a bank of capacitors to add (or remove) capacitance to the NFC antenna system.

For example, monitor circuit 217 can be configured be an inductance measuring circuit to detect a change in the inductance of antenna 218. Monitor circuit 217 can also be configured to monitor the frequency of antenna 218. In some embodiments, monitor circuit 217 can be configured to be a rectifier operatively coupled to antenna 218 and a voltage comparator. A rectifier is a component that converts AC voltage to DC voltage, whereas a voltage comparator compares two voltages. The voltage comparator can be configured to determine when the rectified frequency from antenna 218 is below the DC equivalent of the AC default resonant frequency. In some embodiments, monitor circuit 217 can be configured to be an analog to digital converter (ADC) connected to antenna 218 and a microprocessor configured monitor the frequency of antenna 218.

Returning to FIG. 2, example sensors useful in informing device 200 about its current environment, use, or state are also illustrated. Accelerometer 236 can be used to detect motion of the device 236. In some embodiments, detected motion (acceleration), or lack of detected motion can be interpreted by microcontroller 202 to conclude that device 200 is stationary; was stationary and is now in motion, which may indicate it is being moved toward a customer; was in motion and now is stationary, which may indicate that the device is now in a new environment, and the tuning of the antenna should be checked; or quick changes in motion might indicate the device is in a merchant's pocket, and the device can go into standby mode.

Similarly, proximity detector 234, can be used to determine that a payment object is coming within range of the antenna, which can be used to activate the chip card reader interface 204 or power up or increase power output to the NFC antenna. In some embodiments, the proximity detector 234 can be useful in determining that a payment object is too close to the NFC antenna 218 and is causing the NFC antenna to be detuned.

Figure 4:
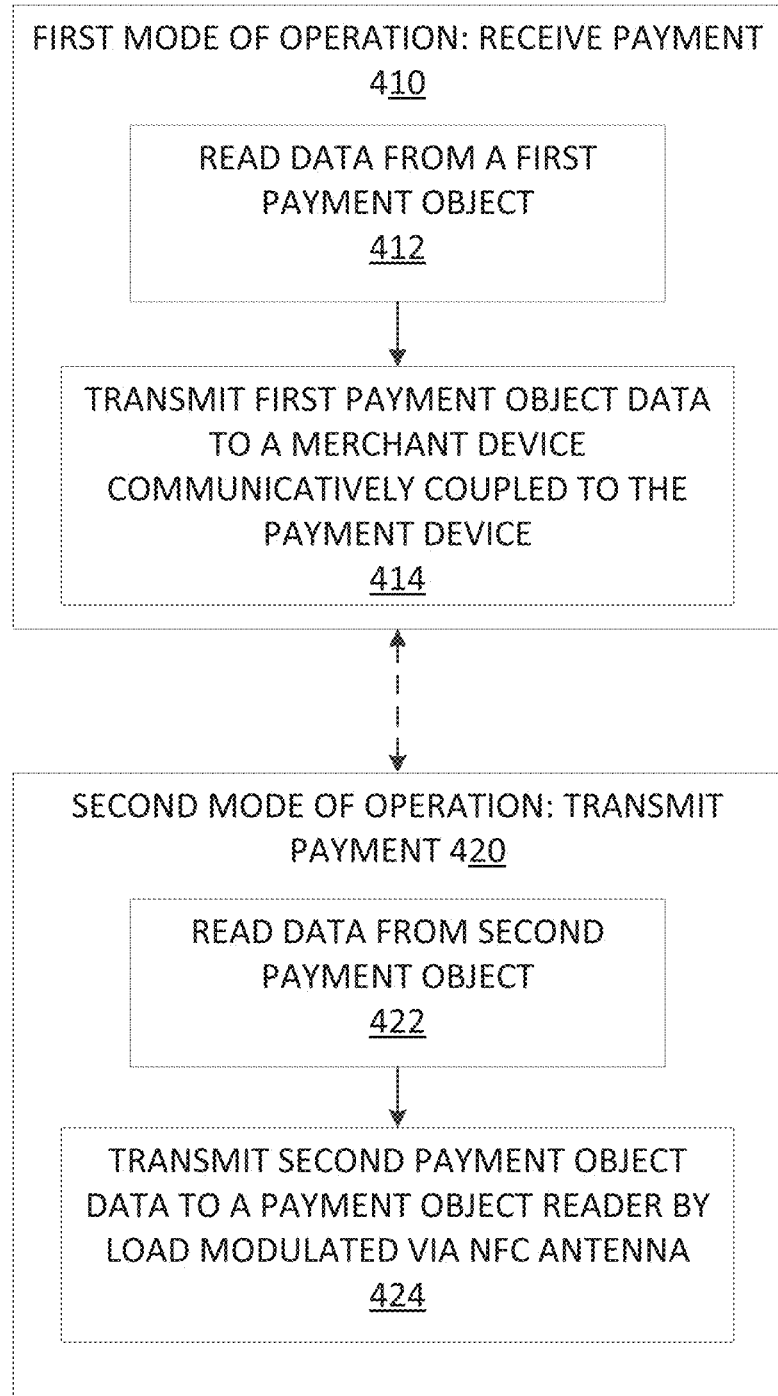
FIG. 4 is an example flow chart of the overall procedure for the payment object reader/transmitter device operating as both a seller device in a first mode of operation and as a buyer device in a second mode of operation.

FIG. 4 illustrates an example flow chart of the overall procedure for the payment device operating as both a seller device in a first receiving mode of operation and as a buyer device in a second transmitting mode of operation. In the first mode of operation 410, the payment device is configured as a seller device to receive and process payments. At 412, the payment device reads data from a first payment object. This can be a magnetic stripe-type card, an IC-enabled card, an IC-enabled device, a NFC-enabled card or another NFC-enabled payment object, such as a NFC-enabled cell phone. At 414, the first payment object data is transmitted to a merchant device communicatively coupled to the payment device. The first payment object data can be transmitted via NFC communication, WiFi, Bluetooth, BLE (Bluetooth low energy), or other short range communication.

In the second mode of operation 420, the payment device is configured as a buyer device to transmit payment information. At 422, data is read from a second payment object. Then at 424, the second payment object data is transmitted to a payment object reader by a load modulated via the NFC antenna. In some embodiments, the second payment object can be the same as the first payment object, or can be data from the first object that is stored by the payment object reader, or a new payment object different from the first payment object, or another form of payment information received from the mobile device.

As a non-limiting example implementation of the operations of FIG. 4, at 412 the data can be read from an IC-enabled payment card inserted in the payment device. At 414, this data can be transmitted to the merchant device or alternatively this data can be transmitted by the payment device, using the NFC antenna, to a NFC-enabled payment object reader. As another non-limiting example, at 412, the data can be read from an IC-enabled payment card inserted in the payment device and stored by the payment device so that the data can be transmitted by the NFC antenna at 424 without being sent to the merchant device and without reading data from a second payment object. In still another non-limiting example, at 412, payment data stored on the merchant device can be received by the payment device and then transmitted to a NFC-enabled payment object reader using the NFC antenna of the payment device.

Figure 5:
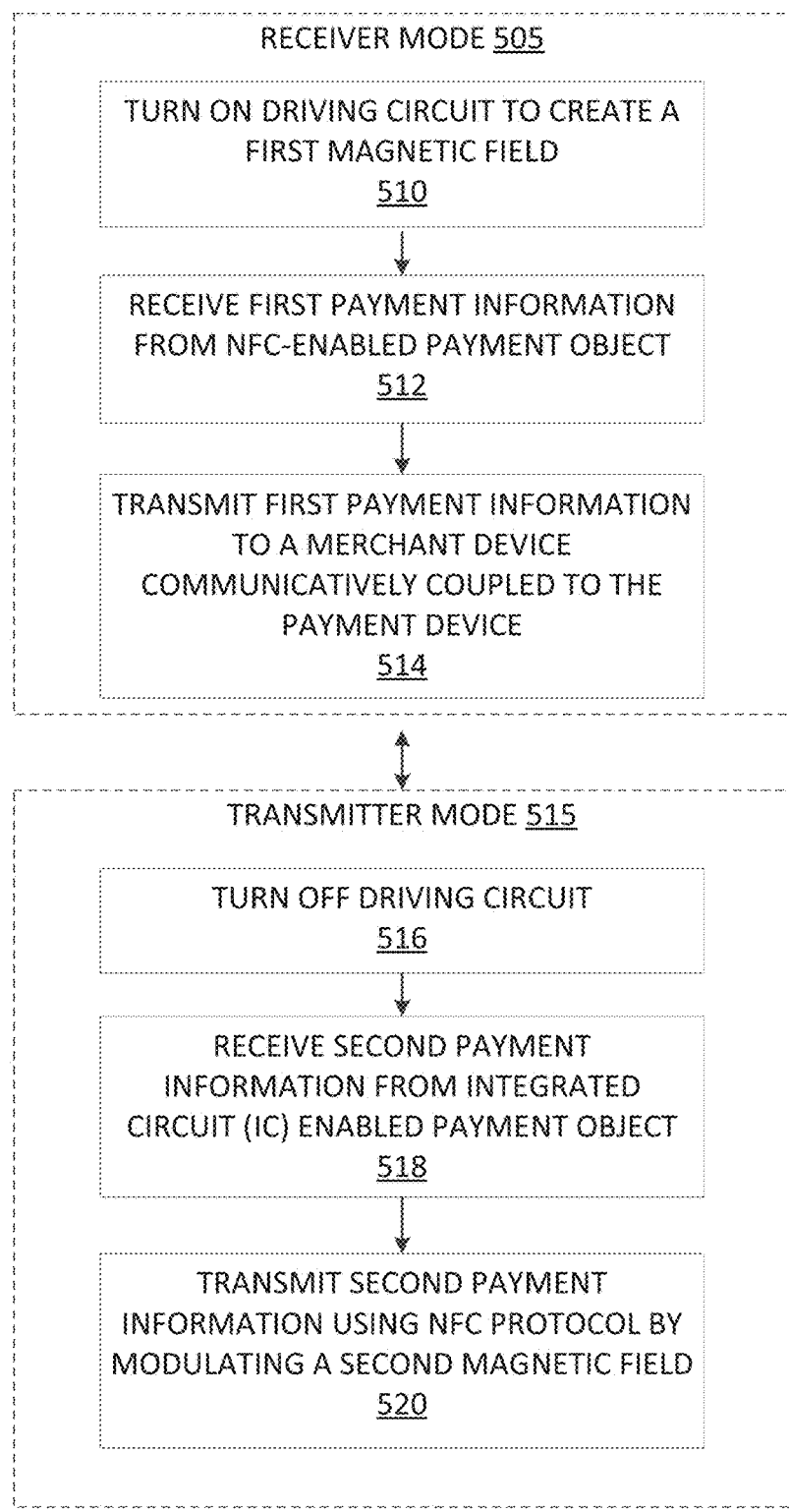
FIG. 5 is an example flow chart of a procedure for the payment object reader/transmitter device operating as a buyer device.

Reference is now made to FIG. 5 showing a more detailed example flow chart of a procedure for the payment device operating in each of the first mode of operation and the second mode of operation. In the first mode of operation, the payment device is able to process NFC and IC type payments. In the second mode of operation, the payment device is able to read IC data from an IC-enabled payment object and transmit the payment data using a NFC protocol.

In the first mode of operation 505, the payment device is configured to receive payment information from a payment object device. At 510, a magnetic field is created by turning on the driving circuit to the NFC antenna. At 512, first payment information is received at the payment device from a NFC-enabled payment object, such as a mobile device having NFC capabilities, such as an iPhone having Apple Pay capabilities. At 512, the first payment information is transmitted to a merchant device communicatively coupled to the payment device. The payment information can also or alternatively be stored by the payment device to be transmitted to a NFC-enabled payment object reader.

In the second mode of operation 515, the payment device is configured to receive IC-enabled payment object information and transmit the payment object information from the payment device using a NFC protocol. At 516, the driving circuit is turned off. At 518, second payment information is received from an IC enabled payment object after interrogation of the IC enabled payment object by the NFC microcontroller. The payment standards for a NFC payment object and an EMV payment object are both established by EMV and are compatible. The NFC microcontroller is thus capable of communicating directly with the chip card interface to read payment information from an IC card in contact with card contacts (for example card contacts 208 in FIG. 2) and then transmit the payment information via the NFC antenna to a NFC enabled payment object reader. In some embodiments the NFC microcontroller can read IC payment data from memory and transmit the payment information via the NFC antenna. In some embodiments, the NFC microcontroller can read data transmitted from the mobile device and transmit the data using the NFC protocol via the NFC antenna of the payment device. At 520, the payment device transmits the second payment information using NFC protocol by modulating a second magnetic field. The payment device modulates a second magnetic field by a microcontroller of the payment device instructing a load modulation subsystem to control the NFC antenna to modulate a second magnetic field.

Figure 6:
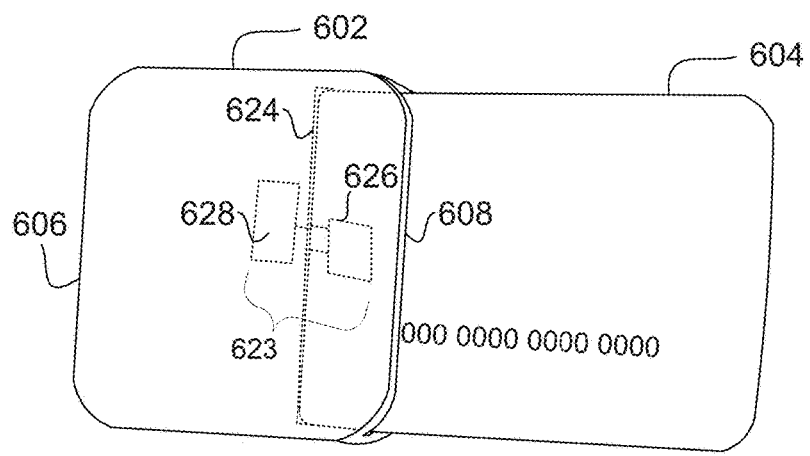
FIG. 6 is an example perspective view of a wireless payment object reader with a smart chip card being inserted.
Figure 7:
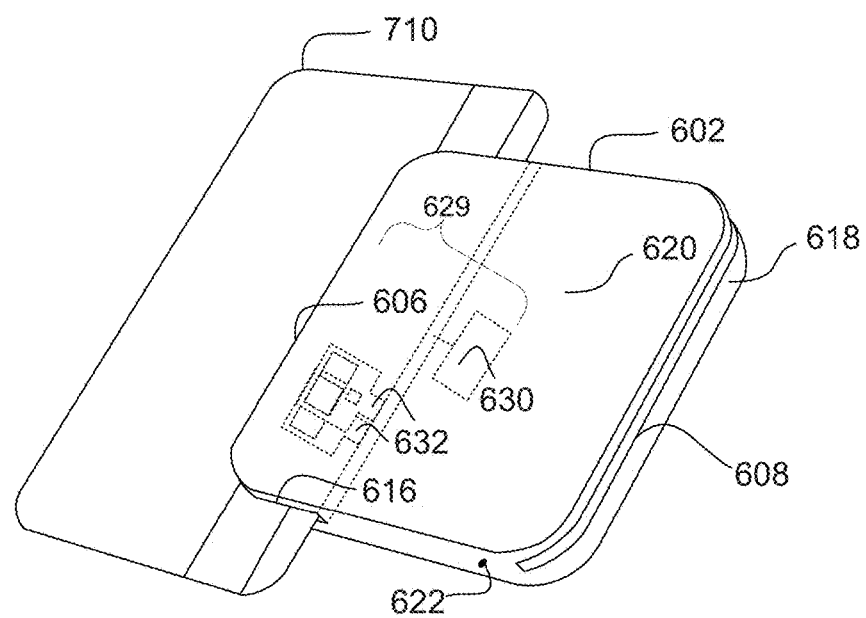
FIG. 7 is an example perspective view of a wireless payment object reader with a magnetic stripe card being swiped.

Reference is now made to FIGS. 6 and 7. FIG. 6 is an example perspective view 600 of a wireless payment device 602 with a smart chip card 604 being inserted at a slot 608 of a chip payment object reader interface 623. FIG. 7 is an example perspective view 712 of a wireless payment object reader 602 with a magnetic stripe card 710 being swiped at a groove 606 of a magnetic stripe reader interface 629 that is opposite to the chip payment object reader interface 623. In some embodiments, the wireless payment device 600 may omit groove 606 and associated magnetic stripe reader interface 629, and provide a single slot 608 for receiving IC payment objects.

The wireless payment device 602 can have a frame that is configured to receive card insertions or card swipes. The frame can include a top surface 620, side surfaces 618, and a bottom surface 622. In the implementations shown in FIGS. 6 and 7, the wireless payment device 602 has a frame that is shaped as a thin parallelepiped, e.g., the width of the frame (along the top surface 620) is at least five or ten times the height (along the side surfaces 618). The top surface and bottom surface can be generally shaped as a square or rectangle, e.g., a square or rectangle with rounded edges.

The side surfaces 618 can include one or more openings that receive cards through, respectively, one or more card interfaces. The one or more card interfaces include circuitry, e.g., chip payment object reader circuitry 628 or magnetic stripe reader circuitry 630, configured to read data stored on the card. In some implementations, the wireless payment object reader has two openings on opposite sides of the frame, and a card interface within each opening. In some implementations, the wireless payment device has a single opening with one of the IC interface, or an MSR interface, or both in a same opening.

The wireless payment object reader 602 can include circuitry configured to direct signals from the one or more card interfaces, to communicate wirelessly with a computing device, and to efficiently power the wireless payment object reader 602. The one or more card interfaces of the wireless payment object reader 602 can include both a chip payment object reader interface 623 and a magnetic stripe reader interface 629. In some implementations, the interfaces are on opposite sides of the wireless payment object reader 602 as shown in FIGS. 6-7. In particular, the payment object reader 602 can include both a groove 606 on one side surface of the frame and a slot 608 on an opposite side surface of the frame. The groove 606 can extend across the entire width of the frame, and can be configured to receive a swipe of a magnetic stripe card. The magnetic stripe reader interface 629, including magnetic read heads 632 positioned to read the magnetic information on the stripe of the card as it is being swiped, are positioned in the groove 606. The slot 608 can extend across part, but not all of the width of the frame, leaving one or more thin side walls 624 to constrain the lateral position of a chip card as it is inserted into the slot 608. The chip payment object reader interface 623, including electrical contacts 626 positioned to electrically engage the contacts on the chip card when it is inserted, are positioned in the slot 608.

In alternative implementations, the interfaces are on the same side of the wireless payment object reader 602 and share an opening for receiving smart chip cards and magnetic stripe cards. In some implementations, a spring-loaded gate is included within the slot 808 of a chip payment object reader interface 623. The spring-loaded gate can be configured to engage the electrical contacts 626 with the contacts of a chip card when a chip card is inserted. On the other hand, the spring-loaded gate keeps the electrical contacts 626 recessed so a card being swiped does not engage with the electrical contacts 626.

In some implementations, the chip payment object reader interface 623 is configured to receive an external adapter through the electrical contacts 626. The external adapter can provide power to recharge the wireless payment object reader 602, e.g., by engaging the electrical contacts 626. The external adapter can connect the chip payment object reader interface 623 to a USB port or power supply. The external adapter can also provide software updates to the wireless payment object reader 602.

Figure 8:
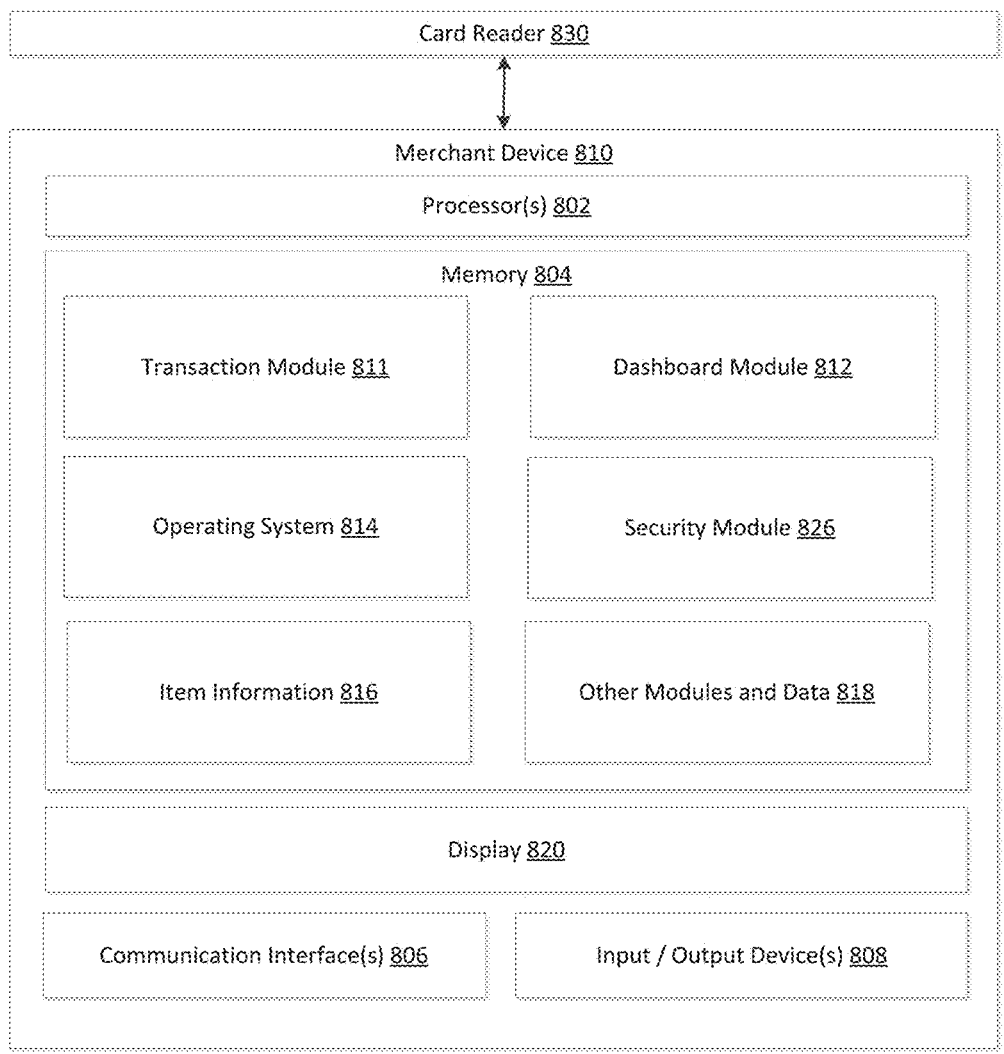
FIG. 8 illustrates an example block diagram of components of a merchant device.

FIG. 8 is a block diagram illustrating select components of an example merchant POS system according to some embodiments. A merchant device 810 can be the merchant device 116 shown in FIG. 1, for example. The merchant device 810 can be any suitable type of computing device, e.g., portable, semi-portable, semi-stationary, or stationary device.

In the example illustrated in FIG. 8, the merchant device 810 includes at least one processor 802, a memory 804, one or more communication interfaces 806, and one or more input/output (I/O) devices 808. Each processor 802 can itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some embodiments, the processor 802 can be one or more hardware processors and/or logic circuits of any suitable type specifically programmed or configured to execute the algorithms and processes described herein by performing various input/output, logical, and/or mathematical operations. The processor 802 can be configured to fetch and execute computer-readable processor-executable instructions stored in the memory 804.

Other components included in the merchant device 810 can include various types of sensors (not shown), which can include a GPS device, an accelerometer, gyroscope, compass, proximity sensor, and the like. Additionally, the merchant device 810 can include various other components that are not shown, examples of which include removable storage, a power source, such as a battery and power control unit, and so forth.

Depending on the configuration of the merchant device 810, the memory 804 can be an example of non-transitory computer storage media (e.g., computer-readable media) and can include volatile and nonvolatile memory and/or removable and non-removable media implemented in any type of technology for storage of information such as computer-readable processor-executable instructions, data structures, program modules or other data. The computer-readable media can include, but is not limited to, RAM, ROM, EEPROM, flash memory, solid-state storage, magnetic disk storage, optical storage, and/or other computer-readable media technology. Further, in some cases, the merchant device 810 can access external storage, such as RAID storage systems, storage arrays, network attached storage, storage area networks, cloud storage, or any other medium that can be used to store information and that can be accessed by the processor 802 directly or through another computing device or network. Accordingly, the memory 804 can be computer storage media able to store instructions, modules or components that can be executed by the processor 802.

The memory 804 can be used to store and maintain any number of functional components or modules that are executable by the processor 802. In some embodiments, these functional components comprise instructions or programs that are executable by the processor 802 and that, when executed, implement operational logic for performing the actions and services attributed above to the merchant device 810. Functional components of the merchant device 810 stored in the memory 804 can include a transaction module 811, a dashboard module 812, and a security module 826, although it can also contain modules or portions of modules assigned herein to the payment processing system 102. The transaction module 811, dashboard module 812 and security module 826 can all be a part of a merchant application, for example merchant application 118, running on merchant device 116. The transaction module 811, for example, presents an interface, such as a payment interface to enable the merchant to conduct transactions, receive payments, and so forth, as well as for communicating with the payment processing system 102 for processing payments and sending transaction information. The dashboard module 812 enables the merchant to manage the merchant's account, the merchant profile, merchant preferences, view saved or new pricing information, communicate with the payment processing system 102 regarding cash advances, offers of incentives, invitations, and the like. The security module 826 can, as described herein, enable the merchant application to encrypt and decrypt transaction information communicated between the merchant device 810 and other system components. Additional functional components can include an operating system 814 for controlling and managing various functions of the merchant device 810 and for enabling basic user interactions with the merchant device 810.

In addition, the memory 804 can also store data, data structures and the like, that are used by the functional components. For example, data stored by the memory 804 can include item information 816 that includes information about the items offered by the merchant, which can include a list of items currently available from the merchant, images of the items, descriptions of the items, prices of the items, and so forth. For instance, when the merchant 122 is setting up the merchant application 118 to accept payments for particular items offered by the merchant 122, the merchant can enter the item information 816 for the particular items. Depending on the type of the merchant device 810, the memory 804 can also optionally include other functional components and data, such as other modules and data 816, which can include programs, drivers, etc., and the data used or generated by the functional components. Further, the merchant device 810 can include many other logical, programmatic and physical components, of which those described are merely examples that are related to the discussion herein.

The communication interface(s) 806 can include one or more interfaces and hardware components for enabling communication with various other devices, such as over the network(s) 114 or directly. For example, communication interface(s) 806 can enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 806 can include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 806 also provides other conventional connections to the network 114 for distribution of files and/or media objects using standard network protocols such as TCP/IP, HTTP, HTTPS and SMTP as will be understood.

The merchant device 810 can further include a display 820, which can employ any suitable display technology. For example, the display 820 can be a liquid crystal display, a plasma display, a light emitting diode display, an OLED (organic light-emitting diode) display, an electronic paper display, or any other suitable type of display able to present digital content thereon. In some embodiments, the display 820 can have a touch sensor associated with the display 820 to provide a touchscreen display configured to receive touch inputs for enabling interaction with a graphical user interface presented on the display 820. Accordingly, embodiments described herein are not limited to any particular display technology. Alternatively, in some embodiments, the merchant device 810 might not include the display 820, and information can be presented by other means, such as aurally.

The merchant device 810 can further include one or more I/O devices 808. The I/O devices 808 can include speakers, a microphone, a camera, and various user controls (e.g., buttons, a joystick, a keyboard, a keypad, etc.), a haptic output device, and so forth.

In addition, the merchant device 810 can include or can be connectable to a payment object reader 830. In some embodiments, the payment object reader 830 can plug in to a port in the merchant device, such as a microphone/headphone port, a data port, or other suitable port, or can communicate via wireless connection to the merchant device. The payment object reader 830 can include a card interface 806 for reading a magnetic stripe or an integrated circuit of a payment card 130, 132, and further can include encryption technology for encrypting the information read from the payment card 130, 132. Alternatively, numerous other types of payment object readers 830 can be employed with the merchant devices 810 herein, depending on the type and configuration of the merchant device 810.

Figure 9:
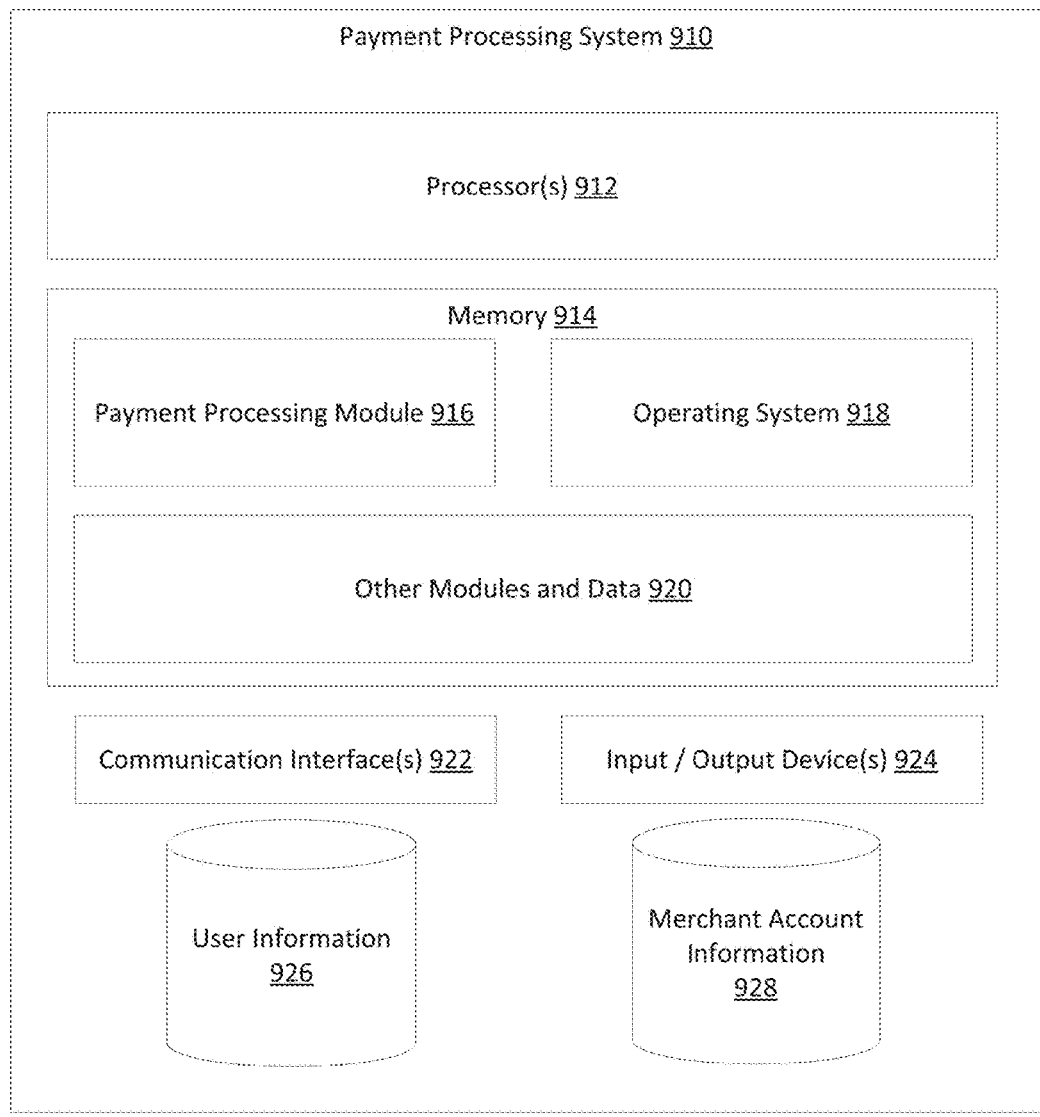
FIG. 9 illustrates an example block diagram of components of a payment processing system.

FIG. 9 is a block diagram illustrating select components of an example payment processing system 910 according to some embodiments. The payment processing system 910 can comprise the payment processing system 102 in an example embodiment. The payment processing system 910 can be any suitable type of computing device capable of sending communications and performing the functions according to the techniques described herein and can be operated by the payment processing service. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the examples herein illustrate the components and data of the payment processing system 910 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 910. Multiple payment processing systems 910 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 9, the payment processing system 910 includes one or more processors 912, one or more memory devices 914, one or more communication interfaces 922, and one or more input/output devices 924. These components can be similar to those described above with reference to FIG. 1 and elsewhere herein.

The memory 914 can be used to store and maintain any number of functional components or modules that are executable by the processor 912. In some embodiments, these functional components comprise instructions or programs that are executable by the processor 912 and that, when executed, implement operational logic for performing the actions and services attributed above to the payment processing system 910. Functional components of the payment processing system 910 stored in the memory 914 can include the payment processing module 916, the operating system 918, and other modules and data 920. These components can be similar to those described with reference to FIG. 1 and elsewhere herein. In addition, the memory 914 can store data used for performing the operations described herein. Thus, the memory 914 can store merchant information 926, including the merchant profiles. Further, the payment processing system 910 can include many other logical, programmatic and physical components, of which those described above are merely examples that are related to the discussion herein.

Figure 10:
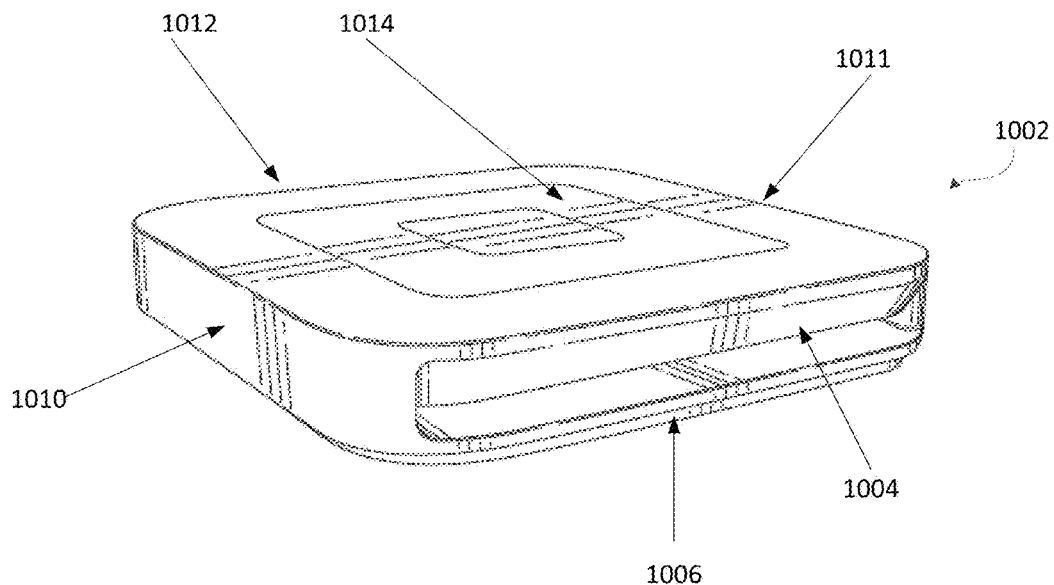
FIG. 10 is an example perspective view of a wireless payment object reader with a single slot.

FIG. 10 illustrates an example perspective view of a wireless payment device 1002 with single slot 1004 for receiving IC payment objects. In some embodiments, more than one slot can be provided. The device 1002 can include a first surface 1006, a side surface 1010, an opposing side surface 1011 and a second surface 1012. The payment device 1002 can also include a front face 1014 and an opposing back face (not shown in FIG. 10). In the implementation shown in FIG. 10, the wireless payment device 1002 has a frame that is shaped as a thin parallelepiped, e.g., the width of the frame (along the first surface 1006) is at least five or ten times the height (along the side surface 1010) in some embodiments. The front face 1014 and bottom face can be generally shaped as a square or rectangle, e.g., a square or rectangle with rounded edges.

The first surface 1006 can include one or more openings that receive cards through, respectively, one or more card interfaces. In the implementation shown in FIG. 10, the wireless payment device 1002 has a single slot 1004. The single slot 1004 includes a card interface. The card interface can include integrated circuit (IC) chip payment object reader circuitry. For example the card interface can include a chip payment object reader circuitry for receiving IC payment objects. The wireless payment device can also have components as shown in FIG. 2. As shown in FIG. 2, the chip payment card reader, similar to chip card reader interface 204, can be coupled to a microcontroller, similar to microcontroller 202.

Furthermore wireless payment device 1002 may also include NFC related components also shown in FIG. 2. For example, similar to FIG. 2, wireless payment device 1002 may also include NFC microcontroller 210. NFC microcontroller 210 is configured to manage the transmission and reception of near field communications through control of driving circuit 212, NFC modulator 214, NFC RX module 216, NFC antenna monitoring circuit 217, and NFC antenna 218. In some embodiments, the antenna 217 is disposed internally in the payment device 1002 near the front face 1014 to facilitate reading NFC enabled payment objects proximate the front face 1014.

The wireless payment object reader 1002 can include circuitry configured to direct signals from the one or more card interfaces, to communicate wirelessly with a computing device, and to efficiently power the wireless payment object reader 1002. The slot 1004 can extend across part, but not all of the width of the frame, leaving one or more thin sidewalls to constrain the lateral position of a chip card as it is inserted into the slot 1004 and to prevent rotation of the card while in the slot. The chip payment object reader interface, including electrical contacts positioned to electrically engage the contacts on the chip card when it is inserted, are positioned in the slot 1004.

In some implementations, the chip payment object reader interface in slot 1004 is configured to receive an external adapter through electrical contacts in wireless payment object reader 1002. The external adapter can provide power to recharge the wireless payment object reader 1002, e.g., by engaging the electrical contacts within slot 1004 of wireless payment object reader. The external adapter can connect the chip payment object reader interface to a USB port or power supply. The external adapter can also provide software updates to the wireless payment object reader 1002.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A payment device configured to receive payment object information and to transmit the payment object information, the payment device comprising:
   a near field communication (NFC) antenna;
   a driving circuit configured to drive the NFC antenna to create a first magnetic field that is capable of being load modulated by a NFC enabled payment object while the payment device is in a first mode and while a switch is closed;
   the switch, wherein a first pole of the switch is coupled to the NFC antenna and a second pole of the switch is coupled to the driving circuit;
   an integrated circuit payment object reader having one or more electrical contacts;
   a load modulation subsystem connected to the NFC antenna; and
   a microcontroller configured to, while the payment device is in the first mode, receive first payment object information via the NFC antenna from the NFC enabled payment object, and transmit the first payment object information to a merchant device,
   the microcontroller further configured to, while the payment device is in a second mode:
      turn off the driving circuit by opening the switch,
      receive second payment object information from an integrated circuit of a payment card while the integrated circuit of the payment card electrically engages with the one or more electrical contacts of the integrated circuit payment object reader, and
      transmit the second payment object information using a NFC protocol by instructing the load modulation subsystem to control the antenna to modulate a second magnetic field.

2. The payment device of claim 1, wherein the NFC antenna is configured to transmit the second payment object information received from the integrated circuit of the payment card to a NFC-enabled payment object reader via the NFC antenna of the payment device using the NFC protocol.

3. The payment device of claim 1, further comprising a memory that stores the second payment object information, wherein transmission of the second payment object information using the NFC protocol occurs while the payment card is not present at the integrated circuit payment object reader.

4. The payment device of claim 1, wherein an inductive load is modulated via the load modulation subsystem to communicate data from the NFC antenna of the payment device by modulating the second magnetic field.

5. A near field communication (NFC) enabled payment device that can be operated in a reader mode or in a transmission mode, the NFC enabled payment device comprising:
   a NFC antenna;
   a driving circuit;
   a switch, the switch coupled at a first pole to the NFC antenna, the switch coupled at a second pole to the driving circuit, wherein the NFC antenna is driven by the driving circuit and the NFC enabled payment device operates in the reader mode while the switch is closed, and wherein the NFC antenna is not driven by the driving circuit and operates in the transmission mode while the switch is open, wherein the NFC enabled payment device while in the reader mode reads first payment data from a first payment object and transmits the first payment data to a merchant device, wherein the NFC enabled payment device while in the transmission mode reads second payment data from a second payment object via contact between the second payment object and a reader interface of the NFC enabled payment device, wherein the NFC enabled payment device while in the transmission mode transmits the second payment data wirelessly via the NFC antenna from the NFC enabled payment device to a payment object reader;

a microcontroller; and a load modulator that is configured to modulate an inductive load via the NFC antenna to communicate payment object data from the NFC enabled payment device.

6. The NFC enabled payment device of claim 5, wherein the reader interface includes an integrated circuit object reader configured to make contact with an integrated circuit in the second payment object to read the second payment data from the second payment object while the NFC enabled payment device is in the transmission mode, wherein the microcontroller receives the second payment data from the integrated circuit object reader and controls a second switch to modulate the NFC antenna to transmit the second payment data to the payment object reader.

7. The NFC enabled payment device of claim 5, wherein the second payment object is a chip-type card.

8. The NFC enabled payment device of claim 5, wherein the second payment object is a magnetic stripe card.

9. The NFC enabled payment device of claim 5, further comprising a slot having an integrated circuit reading contact configured to read data from an integrated circuit payment card.

10. The NFC enabled payment device of claim 5, further comprising a slot having an magnetic stripe reading interface configured to read data from a magnetic stripe payment card.

11. The NFC enabled payment device of claim 5, wherein the payment object reader is a mobile device, and the second payment data is transmitted to a mobile device via short-range wireless communication.

12. A payment device having a first mode of operation where the payment device acts as a receiver and reads first payment data from a first payment object, the payment device also having a second mode of operation where the payment device acts as a transmitter and transmits second payment data from a second payment object to a payment object reader, the payment device comprising:

an antenna;

a driving circuit configured to drive the antenna while a switch is closed;

the switch wherein a first pole of the switch is coupled to the antenna and a second pole of the switch is coupled to the driving circuit; and a microcontroller in communication with the driving circuit, the microcontroller configured to:

read the first payment data from the first payment object while the payment device is in the first mode of operation, transmit the first payment data to a merchant device having a merchant application running thereon while the payment device is in the first mode of operation, open the switch while the payment device is in the second mode of operation, read the second payment data from the second payment object via electrical contact between the second payment object and a reader interface of the payment device while the payment device is in the second mode of operation, and transmit the second payment data from the antenna of the payment device to the payment object reader while the payment device is in the second mode of operation.

13. The payment device of claim 12, wherein, while the payment device is in the first mode of operation, the microcontroller is configured to transmit the first payment data to the merchant device via load modulation at the antenna by powering the driving circuit.

14. The payment device of claim 12, wherein, while the payment device is in the second mode of operation, the microcontroller is configured to read the second payment data from the second payment object by turning off power to the driving circuit and to the antenna.

15. The payment device of claim 12, the microcontroller further configured to encrypt the second payment data in response to reading the second payment data from the second payment object.

16. The payment device of claim 12, further comprising a second switch coupled on a first pole of the second switch to the antenna and on a second pole of the second switch to a load, wherein the second switch is configured to be controlled by the microcontroller, whereby an inductive load can be modulated via the antenna to communicate data from the payment device.

17. A method of receiving and transmitting payment data using a payment device, the payment device having a first mode of operation where the payment device acts as a receiver and reads first payment data from a first payment object, and a second mode of operation where the payment device acts as a transmitter and transmits second payment data from a second payment object to a payment object reader, the method comprising:

reading the first payment data from the first payment object while the payment device is in the first mode of operation;

transmitting the first payment data to a merchant device having a merchant application running thereon while the payment device is in the first mode of operation;

opening a switch while the payment device is in the second mode of operation, wherein a first pole of the switch is coupled to an antenna and a second pole of the switch is coupled to a driving circuit;

reading the second payment data from the second payment object via contact between the second payment object and a reader interface of the payment device while the payment device is in the second mode of operation; and transmitting the second payment data wirelessly via the antenna from the payment device to the payment object reader while the payment device is in the second mode of operation.

18. The method of claim 17 wherein, while the payment device is in the first mode of operation, a microcontroller of the payment device is configured to instruct a load modulation system of the payment device connected to the antenna of the payment device to generate an electric field that is capable of being load modulated by the first payment object, wherein the first payment object is a NFC enabled payment object.

19. The method of claim 17, wherein, while the payment device is in the second mode of operation, the payment device is configured to read payment data from the second payment object by turning off power to the driving circuit of the payment device and to the antenna of the payment device.

20. The method of claim 17, wherein the second payment data is read from an integrated circuit payment card and the second payment data is transmitted using a NFC protocol via the antenna of the payment device.

\* \* \* \* \*